United States Patent
Duru et al.

(10) Patent No.: US 12,340,157 B2
(45) Date of Patent: Jun. 24, 2025

(54) NON-FUNCTIONAL LOOPBACK-PATHS REMOVAL FROM IO-PADS USING LOGIC REPLICATION

(71) Applicant: Synopsys, Inc., Mountain View, CA (US)

(72) Inventors: Florent Sébastien Marc Emmanuel Claude Duru, Shrewsbury, MA (US); Gilles Pierre Rémond, Antony (FR); Olivier Rene Coudert, Sunnyvale, CA (US); Mikhail Bershteyn, Forest Hills, NY (US)

(73) Assignee: Synopsys, Inc., Sunnyvale, CA (US)

( * ) Notice: Subject to any disclaimer, the term of this patent is extended or adjusted under 35 U.S.C. 154(b) by 530 days.

(21) Appl. No.: 17/750,777

(22) Filed: May 23, 2022

(65) Prior Publication Data

US 2022/0382942 A1 Dec. 1, 2022

Related U.S. Application Data

(60) Provisional application No. 63/192,850, filed on May 25, 2021.

(51) Int. Cl.
*G06F 30/30* (2020.01)
*G06F 30/3312* (2020.01)
(Continued)

(52) U.S. Cl.
CPC ........ *G06F 30/337* (2020.01); *G06F 30/3312* (2020.01); *G06F 30/327* (2020.01); *G06F 2119/12* (2020.01)

(58) Field of Classification Search
None
See application file for complete search history.

(56) References Cited

U.S. PATENT DOCUMENTS 5,452,239 A * 9/1995 Dai ................. G06F 30/331
716/108
5,638,290 A * 6/1997 Ginetti ............. G06F 30/327
716/108

(Continued)

OTHER PUBLICATIONS

A. Su et al., "Eliminating False Loops Caused by Sharing in Control Path," IEEE 1996, pp. 39-44. (Year: 1996).*

(Continued)

*Primary Examiner* — Leigh M Garbowski
(74) *Attorney, Agent, or Firm* — Fenwick & West LLP

(57) ABSTRACT

Described is a configuration to remove false paths from an emulation netlist in a chip design under test (DUT). The configuration identifies, in an original netlist, an original subgraph of original logic gates, a subset of inputs (TI), and a subset of outputs (TO). The configuration generates a replicated subgraph of the original subgraph, the replicated subgraph having replicated logic gates corresponding to the original logic gates. The configuration connects the TI with a first replicated logic gate to a constant propagation source and remaining inputs of the replicated logic gates with corresponding original logic gates in the original netlist. The configuration disconnects, in the original netlist, output loads of TO, and connects the output loads of TO with a corresponding equivalent TO in the replicated subgraph. The configuration deletes, in the original netlist, original logic gates unconnected with an output load for TO in the original netlist.

20 Claims, 13 Drawing Sheets

(51) Int. Cl.
    *G06F 30/337*    (2020.01)
    *G06F 30/327*    (2020.01)
    *G06F 119/12*    (2020.01)

(56) References Cited

U.S. PATENT DOCUMENTS

| | | | | |
|---|---|---|---|---|
| 5,675,728 | A * | 10/1997 | Kunda | G01R 31/318328 714/33 |
| 6,292,924 | B1 * | 9/2001 | Pavisic | G06F 30/3312 716/113 |
| 6,760,894 | B1 * | 7/2004 | Yalcin | G06F 30/33 716/113 |
| 7,131,082 | B2 * | 10/2006 | Tsukiyama | G06F 30/3312 716/108 |
| 2001/0020289 | A1 | 9/2001 | Pavisic et al. | |

OTHER PUBLICATIONS

Blaauw, D. et al. "Removing User-Specified False Paths from Timing Graphs." Proceedings of the 37$^{th}$ Annual Design Automation Conference, Jun. 2000, pp. 270-273.
PCT International Search Report and Written Opinion, PCT Application No. PCT/US2022/030742, Sep. 20, 2022, 16 pages.
Wikipedia. "Hardware Emulation." Wikipedia: The Free Encyclopedia, Apr. 28, 2021, 4 pages, [Online] [Retrieved Nov. 7, 2022], Retrieved from the Internet <URL:https://en.wikipedia.org/w/index.php?title=Hardware_emulation&oldid=1020339650>.

* cited by examiner

… (1) …

NON-FUNCTIONAL LOOPBACK-PATHS REMOVAL FROM IO-PADS USING LOGIC REPLICATION

CROSS REFERENCE TO RELATED APPLICATIONS

This application claims the benefit of priority to U.S. Provisional Application No. 63/192,850, filed on May 25, 2021, which is incorporated herein in its entirety for all purposes.

TECHNICAL FIELD

The present disclosure relates to a hardware emulation system, and more particularly, to a system and method for providing non-functional loopback-path removal from an in-out (IO)-pad using logic replication.

BACKGROUND

Speed is a desired quality for emulation tools that verify a correctness of a netlist. The faster the emulation of the netlist, the more coverage, the higher the confidence in the quality of the chip. The emulation speed of a netlist is limited by the longest combinational paths in this netlist: the signals need to traverse all gates along the path in time before being captured by a register.

Netlists may have false paths, i.e., paths that are structural on a chip but non-functional. These false paths often result in over pessimistic estimation of timing. Consequently, performance optimization algorithms may focus on the wrong paths. This causes the speed of emulation to be lesser than what can be actually achieved. Manually removing those false paths from the netlist requires expertise. That manual process, however, makes the emulation susceptible to errors. This may lead to declaring a true functional path as false, which makes the design non-functional at emulation.

An alternative to the manual removal of false paths is to directly modify a customer's register transfer logic (RTL), but this is typically not permitted as it may adversely affect other aspects of the chip design. False paths can be also handled through a timing constraint file (e.g., a Synopsys® Design Constraints (SDC) file), but it requires any timing-driven algorithm to be aware of them, which requires adding more code to the compiler, making it more complex and slower to process.

SUMMARY

Disclosed are configurations (e.g., a system, a method, and a non-transitory computer readable storage medium having stored instructions as described herein) to remove false paths from an emulation netlist through elimination of selected paths of a chip design under test (DUT). By way of example, the configuration identifies an original netlist a subgraph from an original logic circuit having inputs (I), outputs (0), original driver gates, a subset of inputs (TI) of the inputs, and a subset of outputs (TO) of the outputs. The configuration generates a replicated subgraph from the original netlist. The replicated subgraph corresponds to a replicated logic circuit comprised of replicated driver gates corresponding to the original driver gates in the described netlist circuit. The configuration connects the TI with a first replicated driver gate in the replicated subgraph to a constant propagation source and remaining inputs of the replicated driver gates of the replicated subgraph (I-TI) with the original driver gates in the original netlist. The configuration disconnects output loads of TO in the original netlist and connects the output loads of TO in the original netlist with a corresponding equivalent TO in the replicated subgraph. The configuration can then remove the original logic gates in the netlist through identification of logic gates unconnected with an output load for TO in the original netlist for continuing with a compilation flow in an emulation system.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure (FIG. 1 illustrates a structural path and false path from "input" to "output" in accordance with an example of the present disclosure.

DETAILED DESCRIPTION

Figure 1:
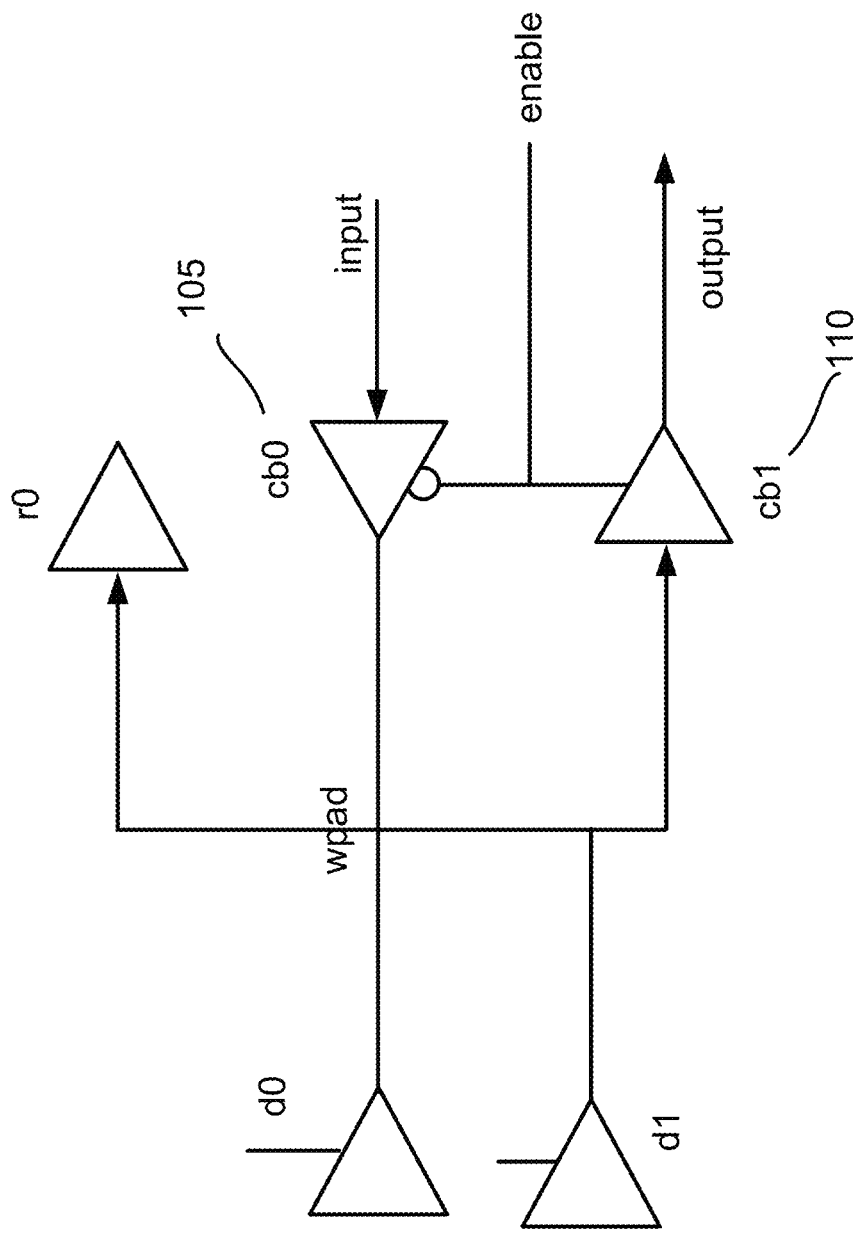

Disclosed is a configuration (including system and process) for non-functional loopback path removal from in-out (IO) pads ("IO-PAD) using logic replication. A pad may be a connection point on a physical chip. The disclosed configuration may be applicable to emulation systems in which the netlist is implemented with hardware and simulated as such. The disclosed configuration transforms parts of the netlist being emulated so that netlist functionality is preserved but some specific non-functional paths are physically removed. The identification of the logic to be transformed can be obtained by interpreting some user commands, or through an automated netlist analysis. This configuration is especially fitted to handle IO-PADs that may be identified.

The disclosed configuration is much faster and more reliable than manual intervention. Based on identified IO- PADs in the netlist, and the disclosed configuration automatically transforms the proper parts of the netlist to remove false paths. The disclosed configuration does not remove true functional paths and therefore does not compromise the netlist functionality. This solution does not require any change to the existing performance-driven algorithms of the compiler, and as such can be used in any compiler.

By way of example, the disclosed configuration provides a configuration for removing false paths from an emulation netlist by eliminating selected paths of a chip design under test (DUT). The configuration identifies a subgraph from an original logic circuit having inputs (I), outputs (O) and original gates and identifies a subset of inputs (TI) of the inputs and a subset of outputs (TO) of the outputs. The configuration generates a replicated subgraph from a netlist of an original logic circuit. The replicated subgraph is a duplicate circuit corresponding to the original circuit. The replicated subgraph has duplicate gates corresponding to the original gates. The configuration connects the TI in the replicated subgraph to a constant propagation source and connects the remaining inputs of the replicated subgraph (I-TI) with original drivers in the original netlist. The input connections of the original subgraph remain unchanged. The configuration disconnects output loads of TO in the original netlist and connects the output load of TO in the original netlist with a corresponding equivalent TO in the replicated subgraph. The configuration removes the original logic gates in the netlist through identification of logic gates lacking an output load and simplifies circuit logic by propagating constants introduced on TI of the duplicated subgraph.

A chip can be represented by an interconnection of gates which form a directed graph. Each gate has inputs and outputs pins. The delay of the longest structural path in a chip dictates the speed of the emulation. A false path in a chip is a structural path through combinational logic that exist in the schematic of a chip but that cannot be captured by any design register. Removing false paths produces a more accurate timing estimation, therefore can lead to faster emulation.

By way of example, referring to a specific case of false paths, assign a graph S={V, E} as a graph of the netlist, where V is a vertex and E is an edge, and assign S'={V', E'} as a combinational subgraph of the netlist. A variable, I, may be a set of its inputs and a variable, O, may be a set of its outputs. Consider TI a subset of I and a variable, o, as an output of the subgraph. A variable, f, may be assigned as a function that computes o from the inputs I of the subgraph S'. Where o is not sensitive to any input in TI, there is a false path through any input of TI through the output o of S'.

Referring now to Figure, (FIG. 1, it illustrates as an example that there is a structural path from input to output in a clean pad implementation in accordance with an example of the present disclosure. In the example, both conditional buffers cb0 105 and cb1 110 are passing only on opposite sensitivity. This means that there is no functional path that goes through "input" and then through "output". Thus, a path through those two buffer gates should never be considered as critical in the chip.

Figure 2:
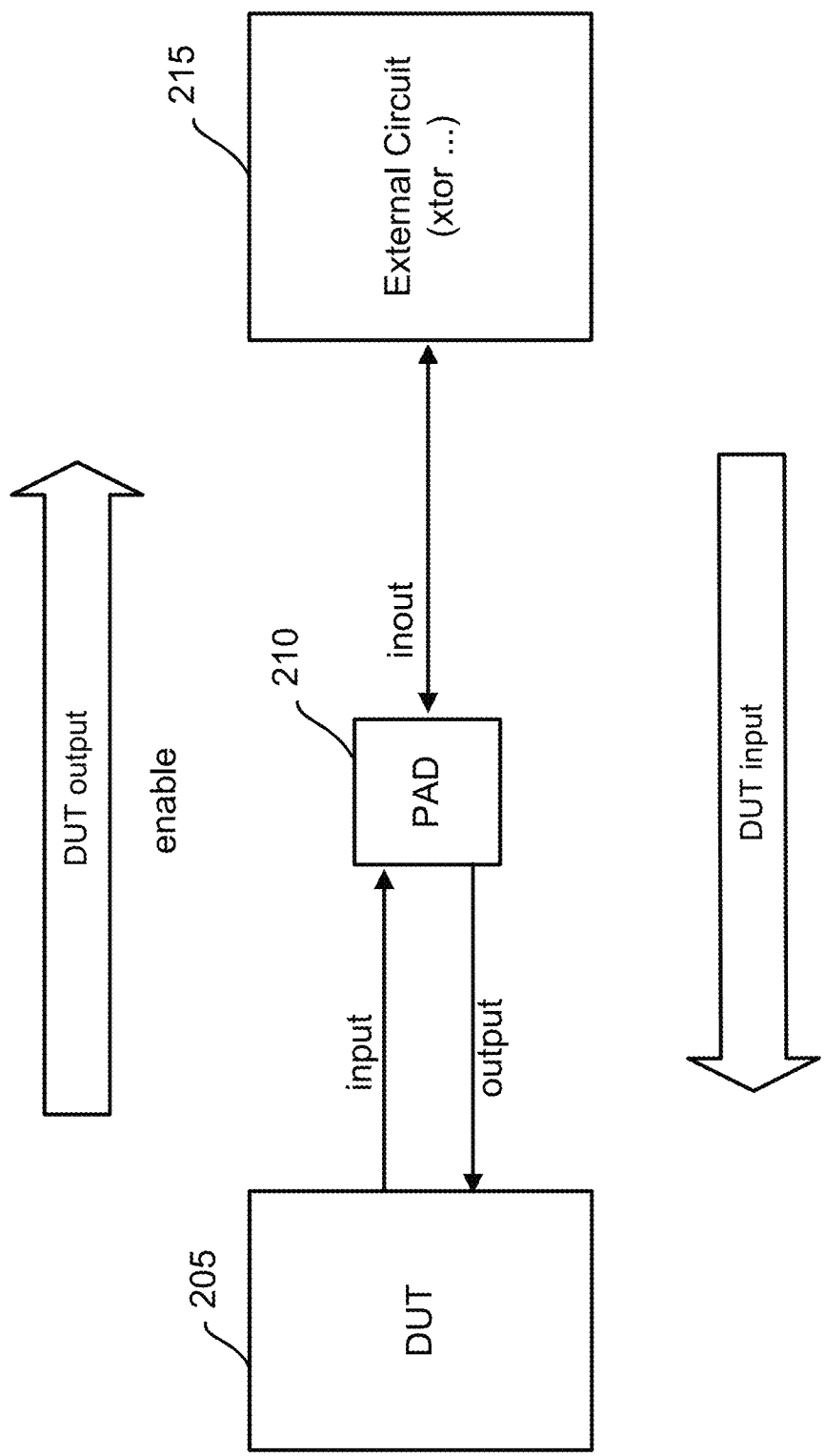
FIG. 2 illustrates an example pad in accordance with an example of the present disclosure.

Next, FIG. 2 illustrates an example PAD configuration in accordance with an example of the present disclosure. A PAD (or pad) is a netlist construct that allows communication between the design (DUT, for Design Under Test) and an external circuit (which may be referenced as an "outside world" relative to the DUT). Specifically, a DUT 205 provide an input to a PAD 210. The DUT 205 receives an output of a PAD 210. A PAD 210 communicates signals in both directions between the DUT 205 and the external circuit 215, so the PAD 210 may be referenced as an in-out-PAD or IO-PAD.

Figure 3:
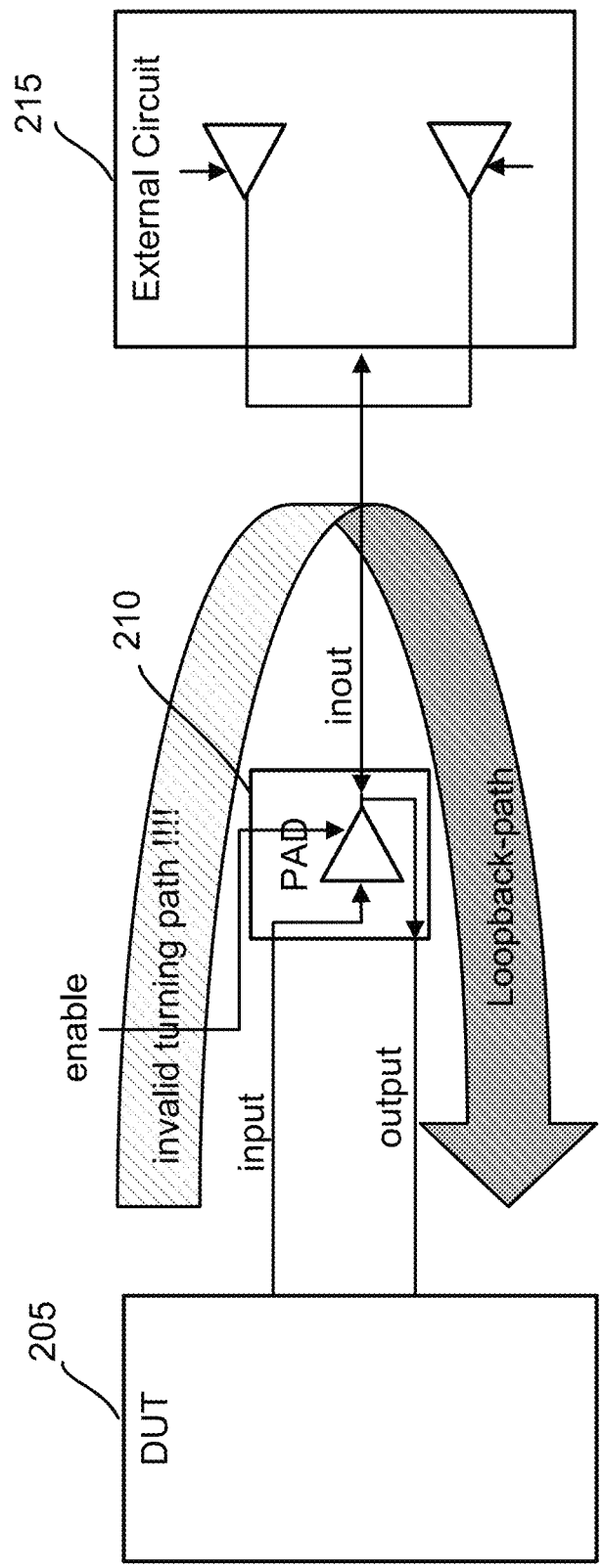
FIG. 3 illustrates a loopback path in accordance with an example of the present disclosure.

FIG. 3 illustrates a loopback-path in accordance with an example of the present disclosure. The loopback path is a path that goes from a DUT 205 through the input and the output of a PAD 210 instance. Typically, the output from a DUT 205 is transmitted to the external circuit 215 (e.g., a universal serial bus (USB) port, ethernet card, etc.). There is usually no loopback-path within the PAD 210 instance itself. If there is a loopback from the output of the PAD 210 as an input back to the DUT 205, that is assumed to be a false path. Even if this path is not enforced to be a false path, the design functionality is usually not affected by loopback-paths through a PAD 210 instance. Below further describes loopback paths in PADs 210 that are false paths or that may be guaranteed that its removal will not produce chip malfunction.

Figure 4:
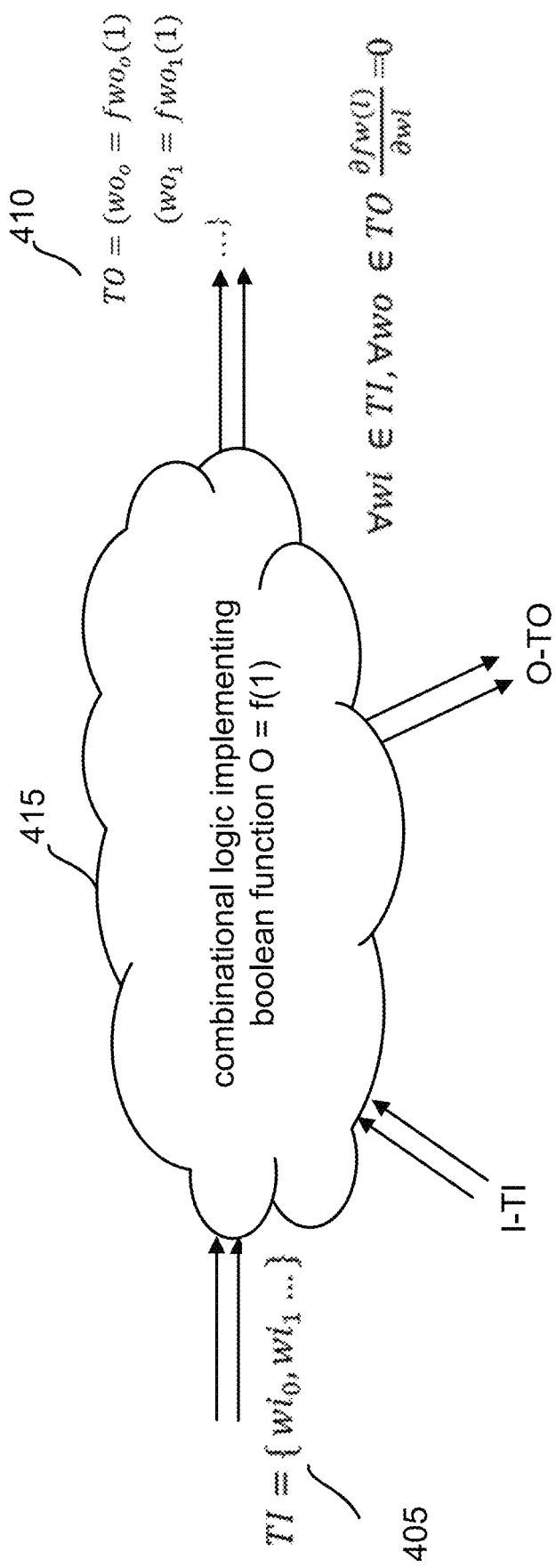
FIG. 4 illustrates in a subgraph of combinational logic implementing a Boolean function of a at least a portion of the loopback path in accordance with an example of the present disclosure.

FIG. 4 illustrates in a subgraph of a combinational logic 415 implementing a Boolean function of at least a portion of the loopback path described in FIG. 3. The subgraph corresponds to the combinational logic 415 inputs and its outputs. By way of example, I and O are sets of inputs (respectively outputs) of the subgraph. In addition, TI 405 and TO 410 are subsets of I and O, respectively, such that all paths from TI to TO through a combinational logic 415 that implement a Boolean function O=f(I) are false, i.e., they do not impact the chip behavior. Several techniques can be used to identify those subgraphs, e.g., a cloud of logic with respect to the false paths:

Using exhaustive simulation or formal methods, e.g., Binary Decision Diagrams (BDDs), SAT (satisfiability).

The user can identify such subgraphs by pointing at the PAD instances (by instance or module name).

The user can use set_false_path transaction control language (TCL) commands in a standard timing constraint file to explicitly notify of false paths.

Here, TI 405 to TO 410 is a structural subgraph provided within a netlist. TI 405 is a subset of I, which are inputs to the subgraph. TO 410 is a subject of O output of the subgraph. A compiler can collect the combinational logic 415 between TI 405 and TO 410 automatically. With this information, a replication of rewiring may be developed to identify false paths as is further described below.

A copy of a subgraph generates TO 410 from elements in a set of inputs I. That is, the original elements in the subgraph are copied to build the logic to generate TO from I. The original logic generating the outputs TO is disconnected and thereafter reconnected to their equivalent in a replicated subgraph. In the replicated subgraph, all inputs are connected to their original driving logic except inputs in TI 405. In addition, all inputs in TI 405 can be connected to arbitrary signals because none of the outputs in TO 410 depend on the inputs in TI 405. This arbitrary reconnection can be used to optimize the replicated (or duplicated) subgraph as much as possible. In particular, these inputs can be reconnected to a constant.

Next, the resulting netlist transformation is optimized. Specifically, in the copied subgraph, the constants put in place of TI 405 are propagated to eliminate constant gates. This may be referenced as constant propagation. Constant propagation deletes gates that can be proved constants because they are useless in hardware. The process propagates a constant value forward in the graph of the netlist. Whenever a set of constants is reaching the inputs of a gate, and it is sufficient to prove that the output of this gate is always outputting the same value, then a constant at output of this current gate can be pushed further. That is, it allows for deleting gates that can be proven constant in the transitive fanout of introduced constants. For example, if a gate implements a multiplier between two numbers and if one of those two numbers can be proven to be zero, e.g., any number times zero is equal to zero, the output of multiplier gate will always be zero. This zero can be pushed further to next gates in fanout and the same operation can be repeated as long as one next gate can be proven constant. In the original subgraph, the logic that produced the outputs TO 410 are now disconnected, and therefore, unneeded. This disconnected logic can be recursively deleted, or removed, which may be referenced as dead logic removal. After the transformation in which unneeded logic is deleted, the paths between TI 405 and TO 410 no longer exist in the netlist.

Figure 5A:
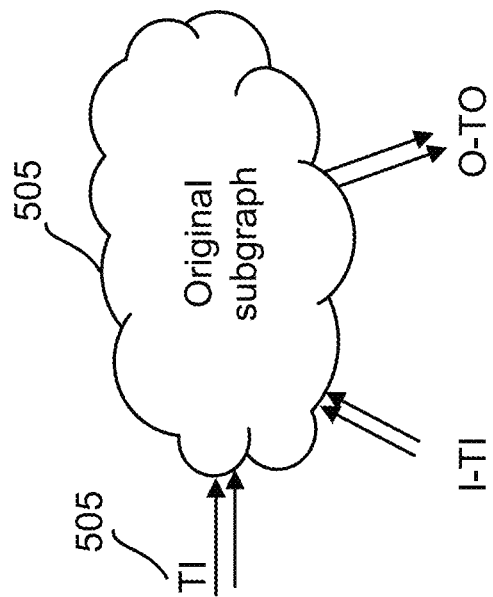
FIGS. 5A and 5B illustrate an original subgraph versus a replicated subgraph after transformation in accordance with an example of the present disclosure.
Figure 5A:
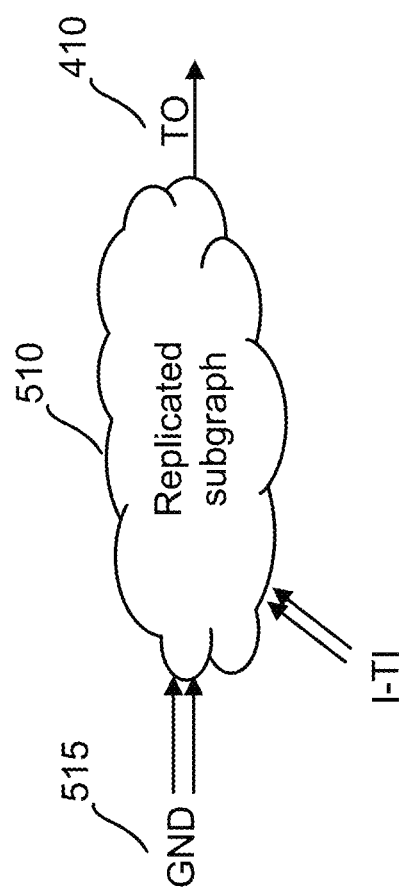

FIG. 5A illustrates the original subgraph 505 versus the replicated subgraph 510 in accordance with an example of the present disclosure. The replicated subgraph 510 is an exact copy of the logic in the false path and is now used to compute TO 410. Elements from TI 405, however, have been replaced by constants in that subgraph. Thus, no path exists from TI 405 to TO 410. The replicated subgraph 510 receives a ground signal (GND) 515 (e.g., logic '0' or logic low signal) to compute TO 410. Note that since I-TI is not a part of the false path, it may be kept as an input to the replicated subgraph 510. This transformation does not increase the length of the new paths. Accordingly, it cannot create true paths that is worse than before. With the paths from TI 405 to TO 410 having been physically eliminated, the logic of the eliminated paths is no longer visible to any timing-driven optimization algorithm. Hence, the focus on actual functional critical paths, results a higher emulation speed. In FIG. 5 the original logic and input, TI 405, also is maintained in order to have the O-TO to the extent the optional path is present as it too is not a part of the false path.

Figure 5B:
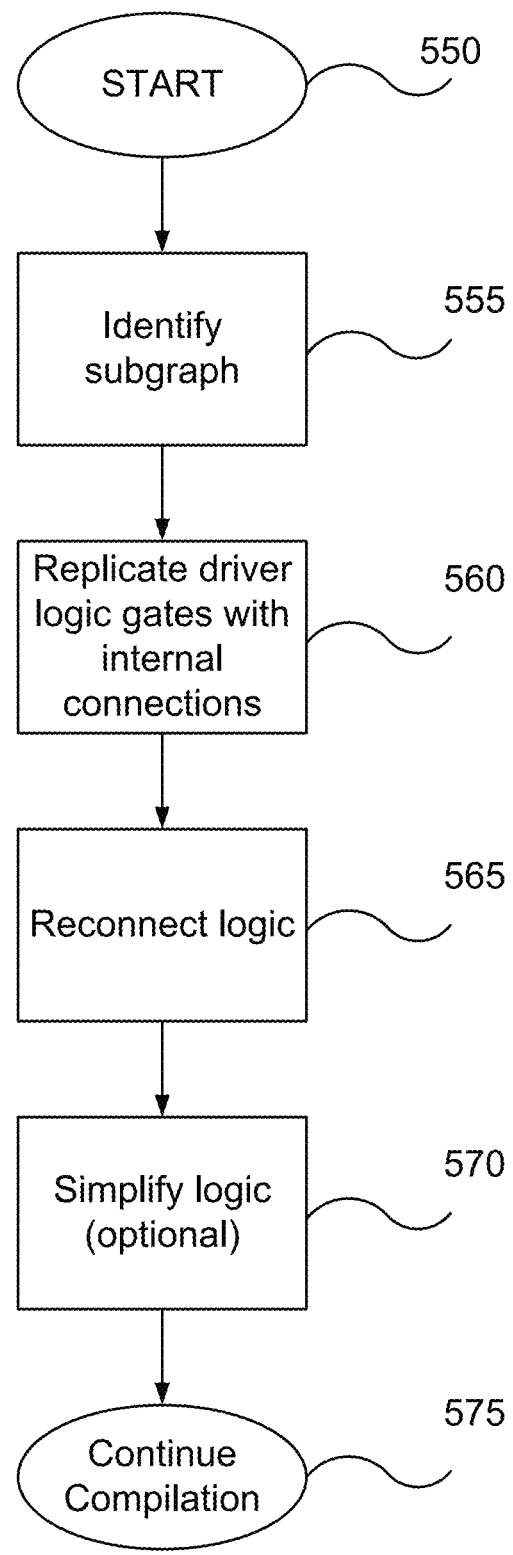
Figure 6:
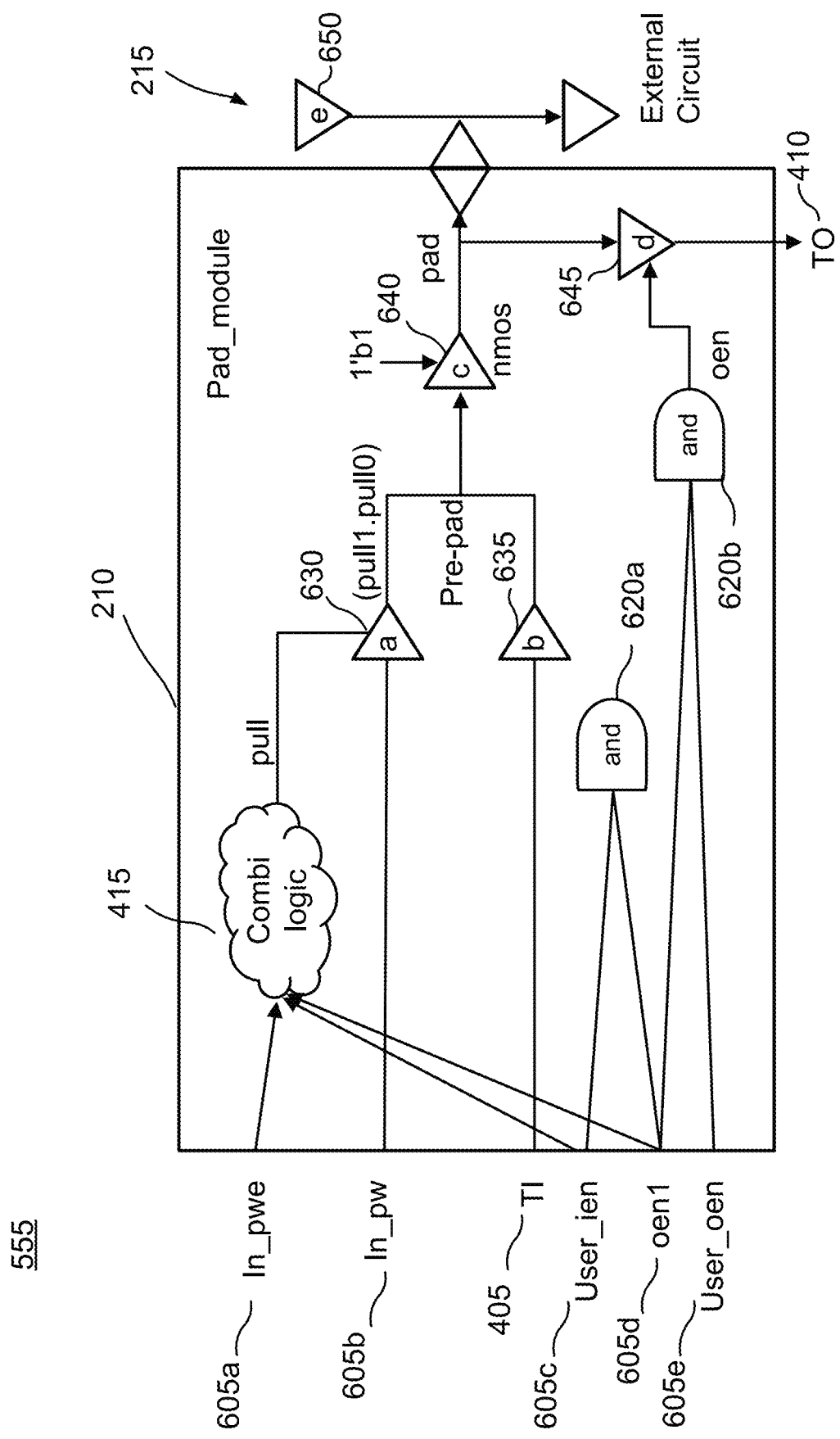
FIG. 6 illustrates subgraph identification process in accordance with an example of the present disclosure.

FIG. 5B illustrates a process flow for removal of non-functional loopback paths from IO-PADS using logic replication in accordance with an example of the present disclosure. The process starts 550 with identification of a subgraph at 555. Referring to FIG. 6, illustrated is identification of a subgraph in accordance with an example of the present disclosure. In FIG. 6, illustrated is a PAD, e.g., 210 connected with DUT 205 inputs and user inputs, e.g., 605*a-e*. The PAD 210 includes an output to an external circuit, e.g., 215. The PAD 210 includes combinational logic gates, e.g., 415, a first logic AND gate 620*a* and a second logic AND gate 620*b* as well as driver logic gates. These gates generate (or form) the identified subgraph (e.g., an interconnection of gates). In this example, the PAD 210 has driver logic gates a 630, b 635, c 640, and d 645 are from a multidriver net and are pulled in to allow for recomputing the value of each and every signal that will be within the subgraph. In addition, the external circuit 215 also includes a driver logic gate 650 that may need to be accounted for in a signal analysis.

The PAD 210 in this example analyzes TI 405 and TO 410. A false path is identified between TI 405 and TO 410 through driver logic gates b 635, c 640, and d 645. The presence of TO 410 shows an output that will go back to an input of the DUT 205. Accordingly, the presence of TO, identifies driver logic gates between TI and TO that form the false path of b, 635 c 640, and d 645 (noting that a 630 is not connected to TI in the figure, but rather b 635 is).

Figure 7:
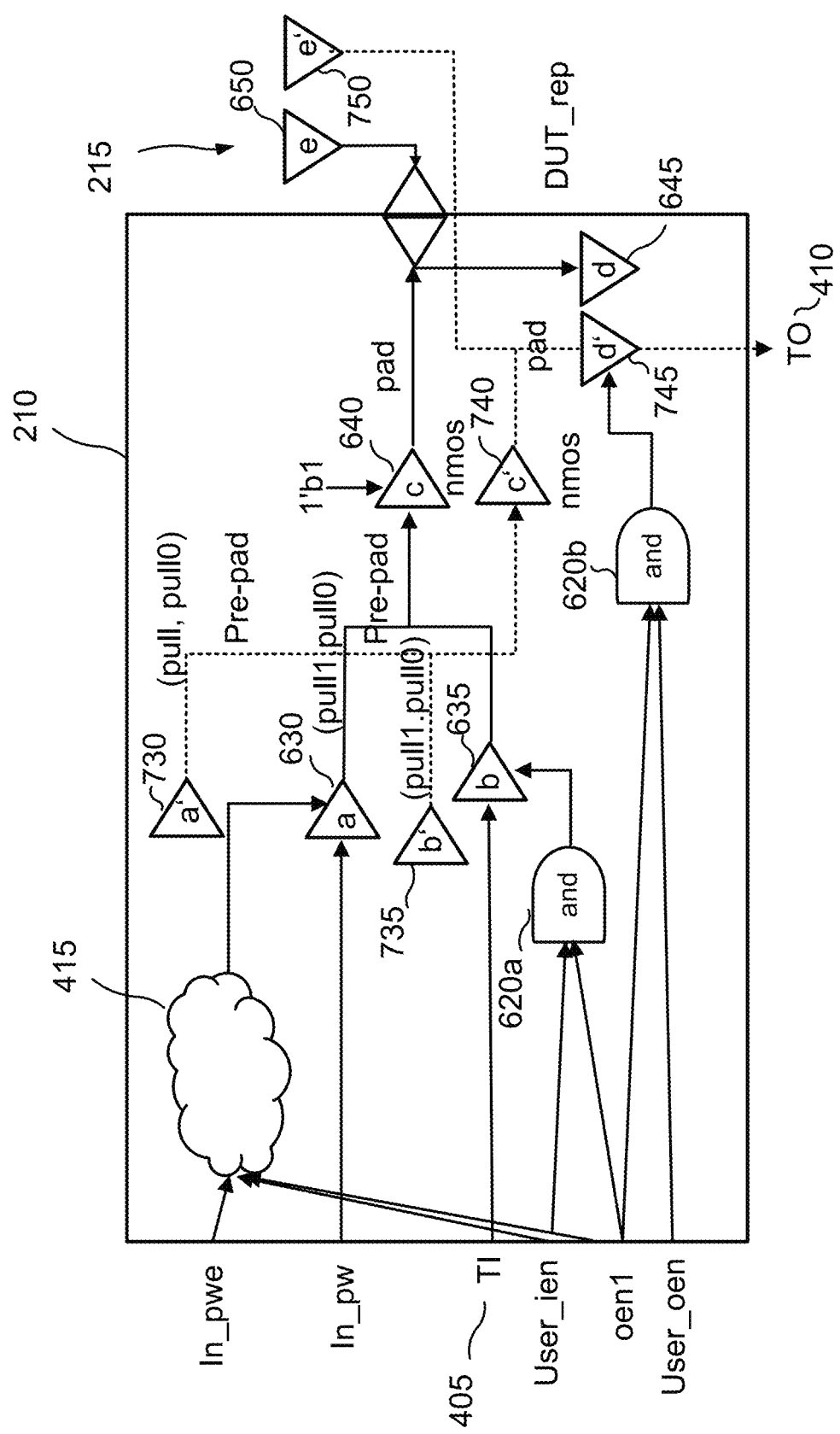
FIG. 7 illustrates logic replication process in accordance with an example of the present disclosure.

Referring back to FIG. 5*b*, with the subgraph identified 555, the process replicates driver logic gates with internal connections, which are b' 735, c' 740 and d' 745 in FIG. 7 at

560. FIG. 7 illustrates driver logic gate replication in accordance with an example of the present disclosure. Specifically, in this step all driver logic gates within subgraph are copied and internal connectivity is restored. In FIG. 7, the replicated driver logic gates are indicated with a prime suffix of its original designation. Specifically, each gate in the path between TI and TO that is needed for the functionality for the logic equation of TO (as represented in the netlist) is replicated and has a prime designation of the original gate. For example, replicated driver logic gates a' 730, b'735, c' 740 and d' 745, which are internal to the PAD 210 along with replicated driver logic gate e' 750, which is external to the PAD 210 and part of the external circuit 215, correspond respectively to PAD 210 driver logic gates a 630, b 635, c 640 and d 645 and external circuit 215's driver logic gate e' 750. Each of the replicated driver logic gates a' 730, b'735, c' 740 and d' 745 are connected together similar to the original driver logic gates a 630, b 635, c 640 and d 645 within the PAD 210 and to external circuit 215's logic gate e 650.

Figure 8:
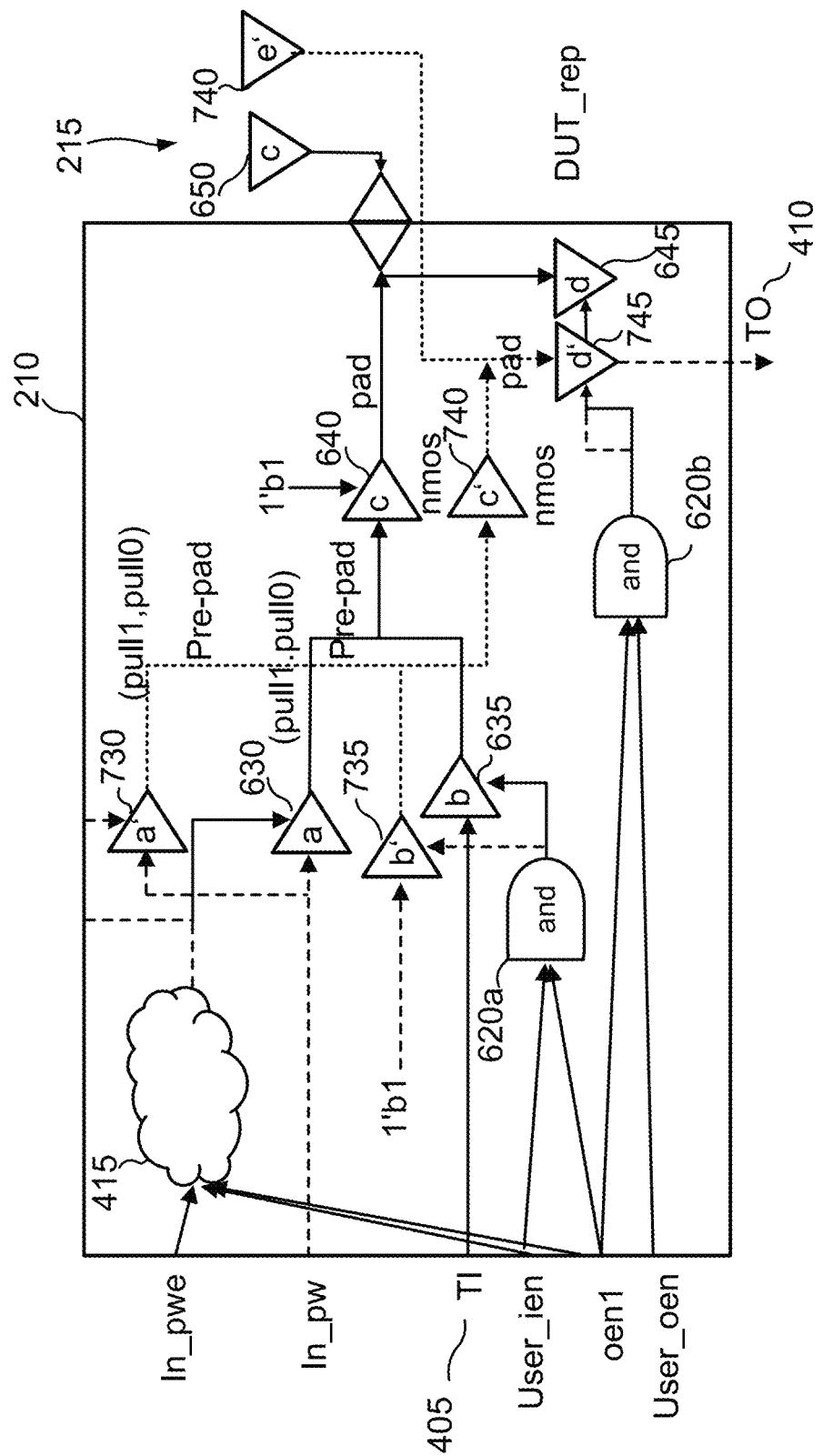
FIG. 8 illustrates logic reconnection process in accordance with an example of the present disclosure.

Referring back to FIG. 5B, with the driver logic gates replicated and connected, the other logic gates in the PAD are connected at 565. Turning to FIG. 8, it illustrates logic reconnection in accordance with an example of the present disclosure. Specifically in this example, combinatory logic gates 415 and AND gates 620*a*, 620*b* are reconnected to their corresponding driver logic gates a 630, b 635, c 640 and d 645 in original netlist except for TI. A TI in replicated logic is reconnected to a constant, GND in this example. TO in original subgraph is disconnected from original driver gate d 645 and reconnected to the contribution coming from replicated driver logic gate d' 745 of the replicated subgraph. That is, to reconnect the logic of the replicated logic, all the replicated inputs except TI are reconnected to the original driver, i.e., the replicated inputs with the replicated driver logic gates a' 730, b'735, c' 740 and d' 745, and the original input with the driver logic gates a 630, b 635, c 640 and d 645. As previously noted, TI in replicated subgraph is connected to a constant value, e.g., ground (or logic '0').

In this example, all the inputs of original subgraph remain untouched and connected to their original driver logic gates a 630, b 635, c 640 and d 645. In the replicated subgraph driver logic gates a' 730, b'735, c' 740 and d' 745, all the inputs of these driver logic gates a' 730, b'735, c' 740 and d' 745 in replicated subgraph, except for inputs in TI input subset, get connected to their corresponding driver logic gates a 630, b 635, c 640 and d 645 in original netlist. In addition, all the inputs of the driver logic gates a' 730, b'735, c' 740 and d' 745 in replicated subgraph that are part of input subset TI get reconnected to constant, e.g., ground (or logic '0').

Figure 9:
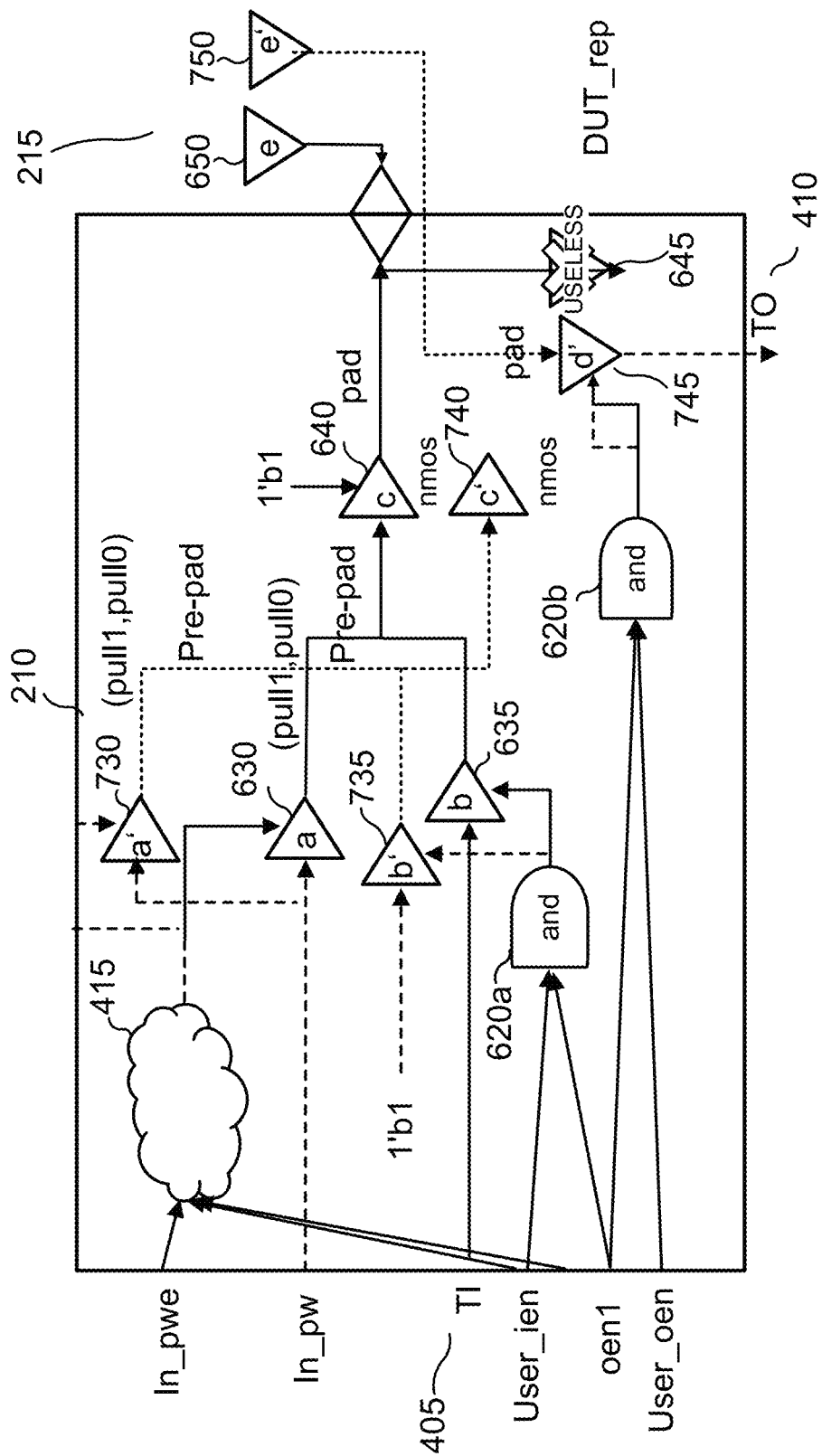
FIG. 9 illustrates logic simplification (or optimization) process in accordance with an example of the present disclosure.

Referring back to FIG. 5B, with the logic reconnected, the process may optionally simplify 570 the logic. FIG. 9 illustrates logic simplification (or optimization) in accordance with an example of the present disclosure. Specifically, some logic may be simplified to be either constant or loadless (without reader). For example, replicated driver gate logic b' 735 has only one non-constant input, 1 b'1. Hence, this replicated driver gate logic b' 735 may be simplified by deleting (or removing) it from the netlist as this gate has been proven to be a logic '0' or '1'. Further, original driver gate logic d 645 of the original subgraph has no load. Accordingly, original driver gate logic d 645 may be deleted from the original netlist. That is, the logic of the original subgraph and replicated subgraph is simplified by removing gates in the path that have only one input or have no load. In this example, the driver gate logic connected to TO was connected to replicated driver logic gate 745 and not the original driver logic gate 645. Accordingly, original driver gate logic d 645 is seen as an unrequired gate and can be removed, while all other gates connect up. Referring back to FIG. 5B, with the logic gates in the pad connected, the compilation flow for the emulation system can continue 575. Further, with simplification of the original netlist, an updated netlist may be generated based on the deleted logic gates.

Figure 10:
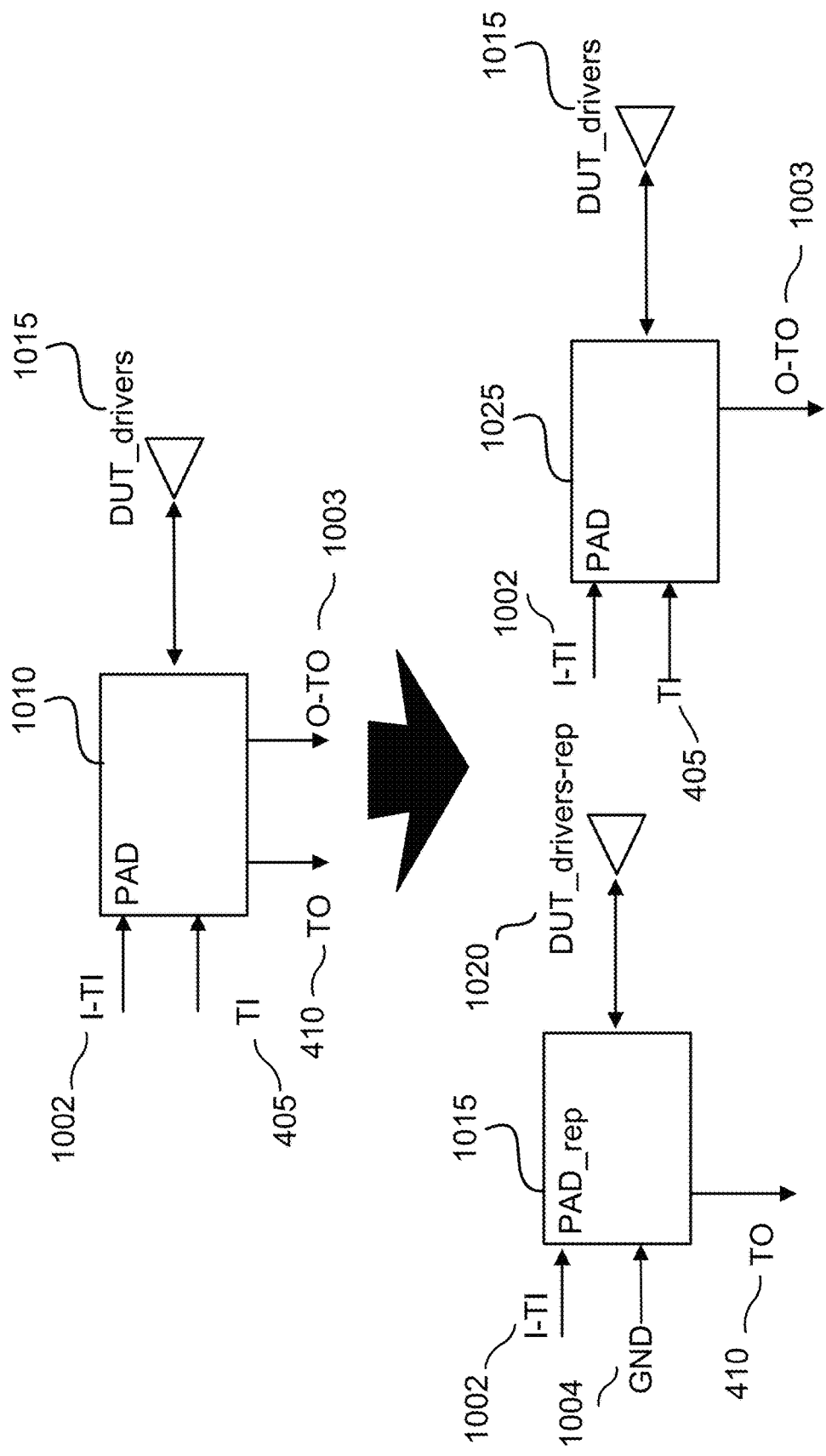
FIG. 10 illustrates a replication of a pad module in accordance with an example of the present disclosure.

FIG. 10 illustrates replication of a PAD module in accordance with an example of the present disclosure. In the illustrated example is module replication instead of traced-subgraph replication. This may be applied when providing an IO-PAD module or instance. FIG. 10 illustrates a pad 1010 with TI 405 and I-TI 1002 and TO 410 and O-TO 1003. The wires for TO 405 are not dependent on TI 405. The pad 1010 couples with DUT drivers 1015. The process generates a replicated pad 1015 with I-T 1002 and ground 1004 as input and TO 410 as output. The replicated pad 1015 couples with a replicated DUT drivers 1020. The TO contribution may be generated by I-TI 1002 and GND 1004. In addition, the DUT driver 1015 replicated across boundaries, i.e., replicated DUT drivers 1020, are replicated as their value may depend on newly inserted GNDs 1004. The process also generates a pad 1025 with I-TI 1002 and TI 405 as input and O-TO 1003 as output. All other outputs have original drivers. As per the disclosed configurations, identification of the loopback paths within PADs which are not altering design functionality, coupled with the replication algorithm described above, improves emulation performance in a reliable and simple way. Because it goes through a simple netlist transformation, no code change in the timing-driven algorithms is required.

The details herein provide an example of confirmation of operational results of the disclosed configuration. At a base level, a directed graph G may be represented by (V, E) having vertices V and edges E. The set of edges E is a subset of V×V. A vertex v2 is a successor of vertex v1 if and only if (iff) (v1, v2) is an edge and v2 is reachable from v1 iff there is a sequence of edges $(v\_i, v\_{i+1})$, $0<=i<=n$, such that $v\_0=v1$ and $v\_{n+1}=v2$.

A subgraph of G is a graph G'=(V', E'), such that V' is included in V, and E' is included in (V'×V') and E. The inputs of a subgraph G'=(V', E') are all the edges (u, v) of E such that u∉V' and v∈V'. Conversely the outputs of a subgraph G'=(V', E') are all edges (u, v) of E such as u∈V' and v∉V'.

A netlist may be reduced to an equivalent netlist made of single-output gates. Therefore, a netlist can be modeled as a directed graph (V, E), whose vertices are gates, and such that there is an edge (v1, v2) iff there is a wire of the netlist connecting the output port of gate v1 to an input port of gate v2. Continuing, by defining B={0,1} as the set of Boolean values, a Boolean function with n variables is a function from B^n into B. Variables X, Y and S are vectors of Boolean variables, e.g., Y={y_1, . . . , y_m}.

Next, g(Y,X) is a Boolean function from B^m×B^n to B, where Y belongs to B^m and X belongs to B^n. For S in B^n, g^S the Boolean function from B^m to B is defined as: g^S(X)=g(S, X). Further, g^S is a cofactor of g with respect to S. A variable S[k] (0<=k<=n) the k-th Boolean value of the n-tuple S belonging to B^n.

A Boolean function o=g(X, Y) is not sensitive to X if for any Y, no value change on X can trigger a value change on the result of g. Next, g(x, X) is a Boolean function from B×B^n to B. The partial derivative function of g with respect to x is as follows: $(\partial g(x,X))/\partial x = g(\partial,X) \oplus g(1,X)$. This shows the derivative function with respect to x being zero is equivalent to g not being sensitive to x.

Figure 11:
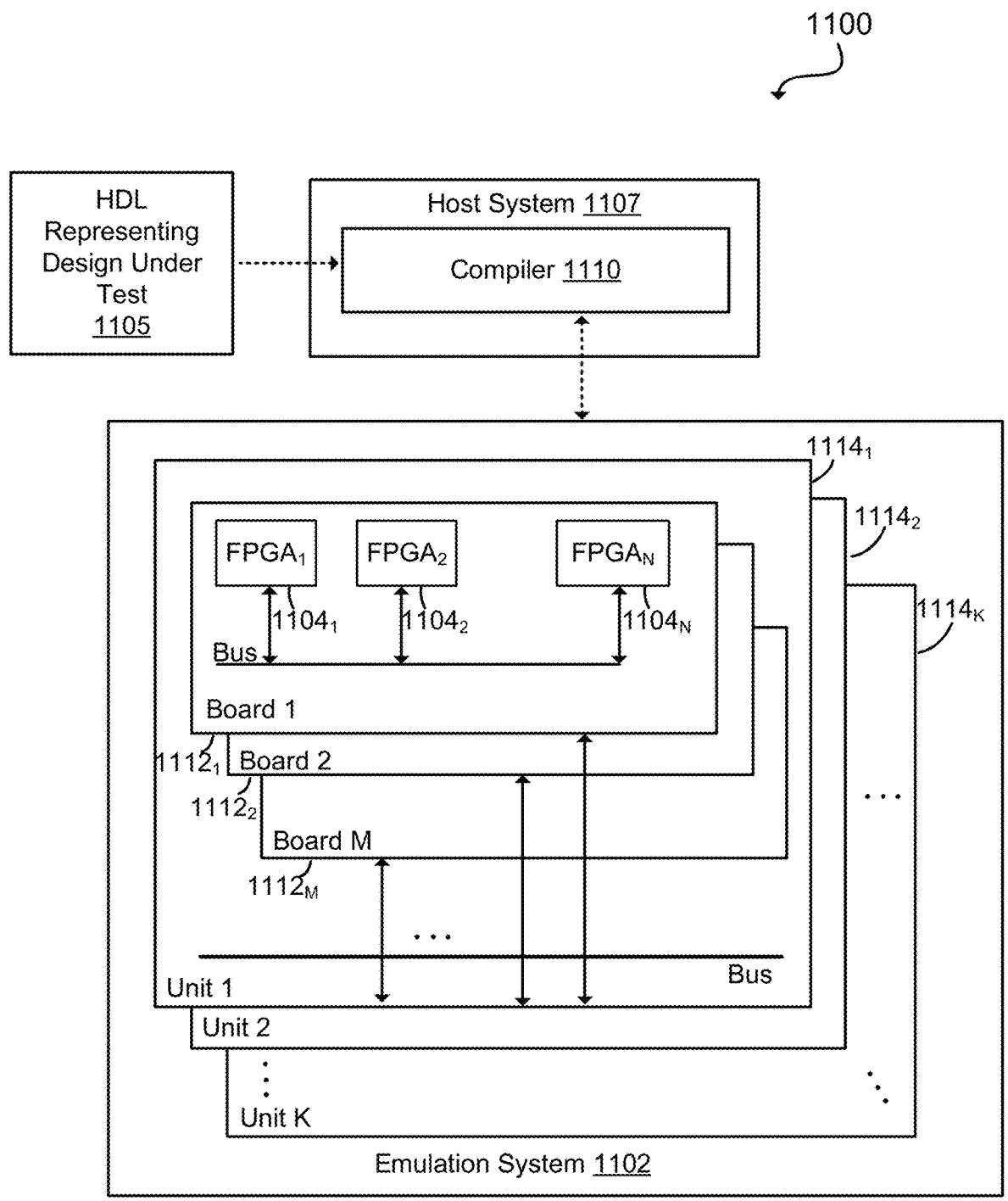
FIG. 11 depicts a diagram of an emulation system in accordance with an example of the present disclosure.

FIG. 11 depicts a diagram of an example emulation environment 1100 that may be part of the emulation system within which the current configuration may operate. An emulation environment 1100 may be configured to verify the functionality of the circuit design. The emulation environment 1100 may include a host system 1107 (e.g., a computer that is part of an EDA system) and an emulation system 1102 (e.g., a set of programmable devices such as Field Programmable Gate Arrays (FPGAs) or processors). The host system generates data and information by using a compiler 1110 to structure the emulation system to emulate a circuit design. A circuit design to be emulated is also referred to as a Design Under Test ('DUT') where data and information from the emulation are used to verify the functionality of the DUT.

The host system 1107 may include one or more processors. In the embodiment where the host system includes multiple processors, the functions described herein as being performed by the host system can be distributed among the multiple processors. The host system 1107 may include a compiler 1110 to transform specifications written in a description language that represents a DUT and to produce data (e.g., binary data) and information that is used to structure the emulation system 1102 to emulate the DUT. The compiler 1110 can transform, change, restructure, add new functions to, and/or control the timing of the DUT.

The host system 1107 and emulation system 1102 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 1102.11. The host system 1107 and emulation system 1102 can exchange data and information through a third device such as a network server.

The emulation system 1102 includes multiple FPGAs (or other modules) such as FPGAs 1104$_1$ and 1104$_2$ as well as additional FPGAs to 1104$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1102 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 1104$_1$-1104$_N$ may be placed onto one or more boards 1112$_1$ and 1112$_2$ as well as additional boards through $1112_M$. Multiple boards can be placed into an emulation unit $1114_1$. The boards within an emulation unit can be connected using the backplane of the emulation unit or any other types of connections. In addition, multiple emulation units (e.g., $1114_1$ and $1114_2$ through $1114_K$) can be connected to each other by cables or any other means to form a multi-emulation unit system.

For a DUT that is to be emulated, the host system 1107 transmits one or more bit files to the emulation system 1102. The bit files may specify a description of the DUT and may further specify partitions of the DUT created by the host system 1107 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1107 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1107 and/or the compiler 1110 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1105 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 12:
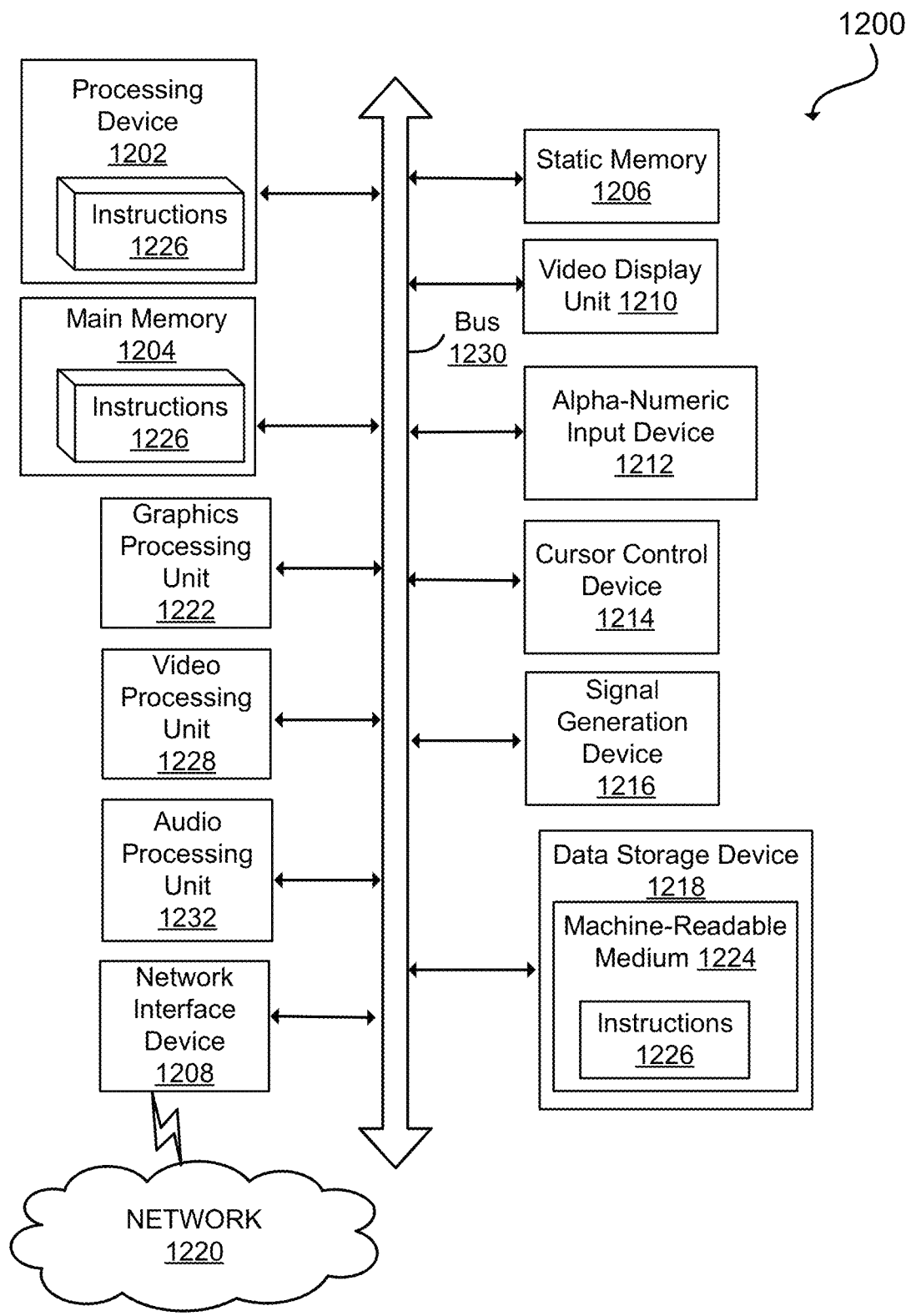
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment. The computer system 1200 may also be a host system for the emulation system of the emulation environment 1100.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

ADDITIONAL INFORMATION

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for emulation of a chip design under test (DUT), the computer-implemented method comprising:
   identifying in the original netlist for the chip DUT, an original subgraph comprised of original logic gates that are electrically coupled to a subset of inputs (TI), wherein a first original logic gate has an input connected to TI, and wherein a second original logic gate has an output to a subset of outputs (TO);
   generating, from the original netlist, a replicated subgraph comprised of replicated logic gates corresponding to the original logic gates;
   connecting an input of a first replicated logic gate in the replicated subgraph to a constant propagation source, wherein the first replicated logic gate corresponds to the first original logic gate;
   connecting remaining inputs of the other replicated logic gates in the replicated subgraph with respective inputs of corresponding original logic gates in the original netlist;
   moving a connection of TO from the output of the second original logic gate to an output of a corresponding second replicated logic gate;
   generating an updated replicated subgraph based on propagating, in the replicated subgraph, a constant from the constant propagation source to compute the moved TO;
   generating an updated original subgraph based on deleting the second original logic gate from the original subgraph; and
   providing the updated original subgraph and the updated replicated subgraph to an emulation system.

2. The method of claim 1, wherein the original logic gates comprise a plurality of logic gates.

3. The method of claim 1, further comprising connecting inputs of the replicated logic gates with an input logic level that is a constant logic value.

4. The method of claim 3, wherein the constant is a logic '0' or ground.

5. The method of claim 1, wherein the replicated subgraph comprises replicated driver logic gates corresponding to a function of TO as designated in the original netlist.

6. The method of claim 1, further comprising simplifying the original logic gates and the replicated logic gates by propagating a constant logic value on TI in the replicated subgraph.

7. The method of claim 6, wherein the simplifying further comprises one of deleting the original logic gates having only one input load connected and deleting the original logic gates having no input load connected.

8. The method of claim 7, further generating an updated netlist in response to simplifying and compiling the updated netlist.

9. A non-transitory computer readable storage medium comprising stored instructions, the instructions to remove false paths from an emulation netlist by elimination of selected paths of a chip design under test (DUT), the instructions when executed cause at least one processor to:
   identify, in an original netlist for the chip DUT, an original subgraph comprised of original logic gates that are electrically coupled to a subset of inputs (TI), wherein a first original logic gate has an input connected to TI and wherein a second original logic gate has an output to a subset of outputs (TO);
   generate, from the original netlist, a replicated subgraph of a replicated logic circuit comprised of replicated logic gates corresponding to the original logic gates;
   connect an input of a first replicated logic gate in the replicated subgraph to a constant propagation source, wherein the first replicated logic gate corresponds to the first original logic gate;
   connect remaining inputs of other replicated logic gates in the replicated subgraph with respective inputs of corresponding original logic gates in the original netlist;
   move a connection of TO from the output of the second original logic gate to an output of a corresponding second replicated logic gate;
   generate an updated replicated subgraph based on propagating, in the replicated subgraph, a constant from the constant propagation source to compute the moved TO;
   generate an updated original subgraph based on deletion of the second original logic gate from the original subgraph; and
   provide the updated original subgraph and the updated replicated subgraph to an emulation system.

10. The computer readable storage medium of claim 9, wherein the original logic gates comprise a plurality of logic gates.

11. The computer readable storage medium of claim 9, further comprising instructions that when executed cause the processor to connect inputs of the replicated logic gates with a input logic signal that is a constant.

12. The computer readable storage medium of claim 11, wherein the constant is a logic '0' or ground.

13. The computer readable storage medium of claim 9, wherein the replicated subgraph comprises replicated driver logic gates corresponding to a function of TO as designated in the original netlist.

14. The computer readable storage medium of claim 9, further comprising instructions that when executed causes the processor to simplify the original logic gates and the replicated gates through propagation of a constant logic value on TI in the replicated subgraph.

15. The computer readable storage medium of claim 14, wherein the instructions to simplify further comprises instructions that when executed causes the processor to one of delete the original logic gates having only one input connected or delete the original logic gates having no input load connected.

16. The computer readable storage medium of claim 15, further comprising instructions that when executed causes the processor to generate an updated netlist in response to the instructions to simply and further comprising instructions that when executed cause the processor to compile the updated netlist.

17. A system comprising:
   a processor; and
   a non-transitory memory coupled with the processor, the memory comprising stored instructions to remove false paths from an emulation netlist through elimination of selected paths of a chip design under test (DUT), the instructions when executed causes the processor to:
identify, in an original netlist for the chip DUT, an original subgraph of original logic gates that are electrically coupled to a subset of inputs (TI), wherein a first original logic gate has an input connected to TI, and wherein a second original logic gate has an output to a subset of outputs (TO);
generate a replicated subgraph of the original subgraph, the replicated subgraph having replicated logic gates corresponding to the original logic gates;
connect an input of a first replicated logic gate in the replicated subgraph to a constant propagation source, wherein the first replicated logic gate corresponds to the first original logic gate; and
connect remaining inputs of other replicated logic gates in the replicated subgraph with respective inputs of corresponding original logic gates in the original netlist;
move a connection of TO from the output of the second original logic gate to an output of a corresponding second replicated logic gate;
generate an updated replicated subgraph based on propagating, in the replicated subgraph, a constant from the constant propagation source to compute the moved TO;
generate an updated original subgraph based on deleting the second original logic gate from the original subgraph; and
provide the updated original subgraph and the updated replicated subgraph to an emulation system.

18. The system of claim 17, further comprising instructions that when executed causes the processor to simplify the original logic gates and the replicated logic gates through propagation of a constant logic value on TI in the replicated subgraph.

19. The system of claim 18, wherein the instructions to simplify further comprises instructions that when executed causes the processor to delete the original logic gates having only one input connected and the instructions to simplify further comprises instructions that when executed causes the processor to delete the original logic gates having no input load connected.

20. The system of claim 18, further comprising instructions that when executed causes the processor to generate an updated netlist in response to the instructions to simply and further comprising instructions that when executed cause the processor to compile the updated netlist.

\* \* \* \* \*